US009245007B2

(12) United States Patent
Joshi et al.

(10) Patent No.: US 9,245,007 B2
(45) Date of Patent: Jan. 26, 2016

(54) DYNAMICALLY DETECTING NEAR-DUPLICATE DOCUMENTS

(75) Inventors: Sachindra Joshi, New Delhi (IN); Kenney Ng, Arlington, MA (US); Sandeep Singh, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 974 days.

(21) Appl. No.: 12/511,175

(22) Filed: Jul. 29, 2009

(65) Prior Publication Data

US 2011/0029491 A1    Feb. 3, 2011

(51) Int. Cl.
 *G06F 17/30* (2006.01)
(52) U.S. Cl.
 CPC .............................. *G06F 17/30675* (2013.01)
(58) Field of Classification Search
 CPC ..................... G06F 17/30675; G06F 17/30705
 USPC ............. 707/692, 999.001, 999.008, 999.201
 See application file for complete search history.

(56) References Cited

U.S. PATENT DOCUMENTS

| 6,658,423 | B1 | 12/2003 | Pugh et al. | |
|---|---|---|---|---|
| 7,139,756 | B2 | 11/2006 | Cooper et al. | |
| 2004/0223648 | A1* | 11/2004 | Hoene et al. | 382/218 |
| 2006/0155725 | A1* | 7/2006 | Foster et al. | 707/100 |
| 2006/0253438 | A1* | 11/2006 | Ren et al. | 707/5 |
| 2006/0294077 | A1* | 12/2006 | Bluhm et al. | 707/3 |
| 2009/0070325 | A1* | 3/2009 | Gabriel et al. | 707/5 |
| 2009/0307256 | A1* | 12/2009 | Tiyyagura | 707/102 |

FOREIGN PATENT DOCUMENTS

| WO | WO2007008166 A2 | 1/2007 |
|---|---|---|
| WO | WO2007059034 A1 | 5/2007 |
| WO | WO2007075155 | 7/2007 |
| WO | WO2007089264 A2 | 8/2007 |

OTHER PUBLICATIONS

Andrei Z. Broder. 2000. Identifying and Filtering Near-Duplicate Documents. In Proceedings of the 11th Annual Symposium on Combinatorial Pattern Matching (COM '00), Raffaele Giancarlo and David Sankoff (Eds.). Springer-Verlag, London, UK, UK, 1-10.*
Solka et al., Identifying Cross Copora Document Associations Via Minimal Spanning Trees, 2004, <http://binf.gmu.edu/jsolka/PAPERS/serendipity_int04_paper.pdf>.*

(Continued)

*Primary Examiner* — Syed Hasan
(74) *Attorney, Agent, or Firm* — Ryan, Mason & Lewis, LLP

(57) ABSTRACT

Techniques for detecting one or more documents that are duplicate or near-duplicate of a first document are provided. The techniques include obtaining a first document, obtaining one or more additional documents, retrieving a set of one or more document signatures for each document, and detecting one or more documents that are duplicate or near-duplicate of the first document by detecting each of the one or more additional documents that have at least a minimum number of signatures in common with the first document, wherein detecting each of the one or more additional documents that have at least a minimum number of signatures in common with the first document comprises dynamically using at least one of a user-configurable similarity definition and a user-configurable similarity threshold value.

12 Claims, 6 Drawing Sheets

(56) References Cited

OTHER PUBLICATIONS

Xiao et al. Efficient similarity joins for near duplicate detection (2008).
Shokouhi et al. Distributed Text Retrieval From Overlapping Collections (2007).
Yang et al. Next steps in near-duplicate detection for eRulemaking (2006).
Yang and Callan. Near-duplicate detection by instance-level constrained clustering (2006).
Ye et al. A Systematic Study of Parameter Correlations in Large Scale Duplicate Document Detection (2006).
Tahayna et al., An Efficient Method for Near-Duplicate Video Detection—Book Series Lecture Notes in Computer Science Publisher Springer Berlin / Heidelberg.
Foo et al. Detection of near duplicate images for web searching. 2007.
Bernstein et al. Compact Features for Detection of Near-Duplicates in Distributed Retrieval, School of Computer Science and Information Technology, RMIT University, Melbourne, Australia.
Broder, A.Z. Identifying and Filtering Near-Duplicate Documents.
Charikar, M.S. Similarity Estimation Techniques from Rounding Algorithms.
Unstructured Information Management Applications (UIMA): http://incubator.apache.org/uima/.

* cited by examiner

DYNAMICALLY DETECTING NEAR-DUPLICATE DOCUMENTS

FIELD OF THE INVENTION

Embodiments of the invention generally relate to information technology, and, more particularly, to document detection.

BACKGROUND OF THE INVENTION

Some enterprises and/or companies desire (or can be required) to manage all digital information including emails such that it is not prematurely destroyed or lost and is easily discoverable (for example, to provide the correct information to a court or outside companies in response to a lawsuit). By way of example, electronic discovery (e-discovery) techniques in the legal community can concern the detailed analysis of e-mails gathered in response to a lawsuit. Existing approaches, however, include primarily manual processes, which are labor and cost intensive.

Existing approaches can also include a brute force approach of comparing all sub-strings of a pair of documents. However, such an approach is computationally prohibitive. Further, a primary focus of existing approaches has been on finding near duplicates, but not on dynamic detection of near duplicates or on an online version of the challenge.

SUMMARY OF THE INVENTION

Principles and embodiments of the invention provide techniques for dynamically detecting near-duplicate documents. An exemplary method (which may be computer-implemented) for detecting one or more documents that are duplicate or near-duplicate of a first document, according to one aspect of the invention, can include steps of obtaining a first document, obtaining one or more additional documents, retrieving a set of one or more document signatures for each document, and detecting one or more documents that are duplicate or near-duplicate of the first document by detecting each of the one or more additional documents that have at least a minimum number of signatures in common with the first document, wherein detecting each of the one or more additional documents that have at least a minimum number of signatures in common with the first document comprises dynamically using at least one of a user-configurable similarity definition and a user-configurable similarity threshold value.

One or more embodiments of the invention or elements thereof can be implemented in the form of a computer product including a tangible computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
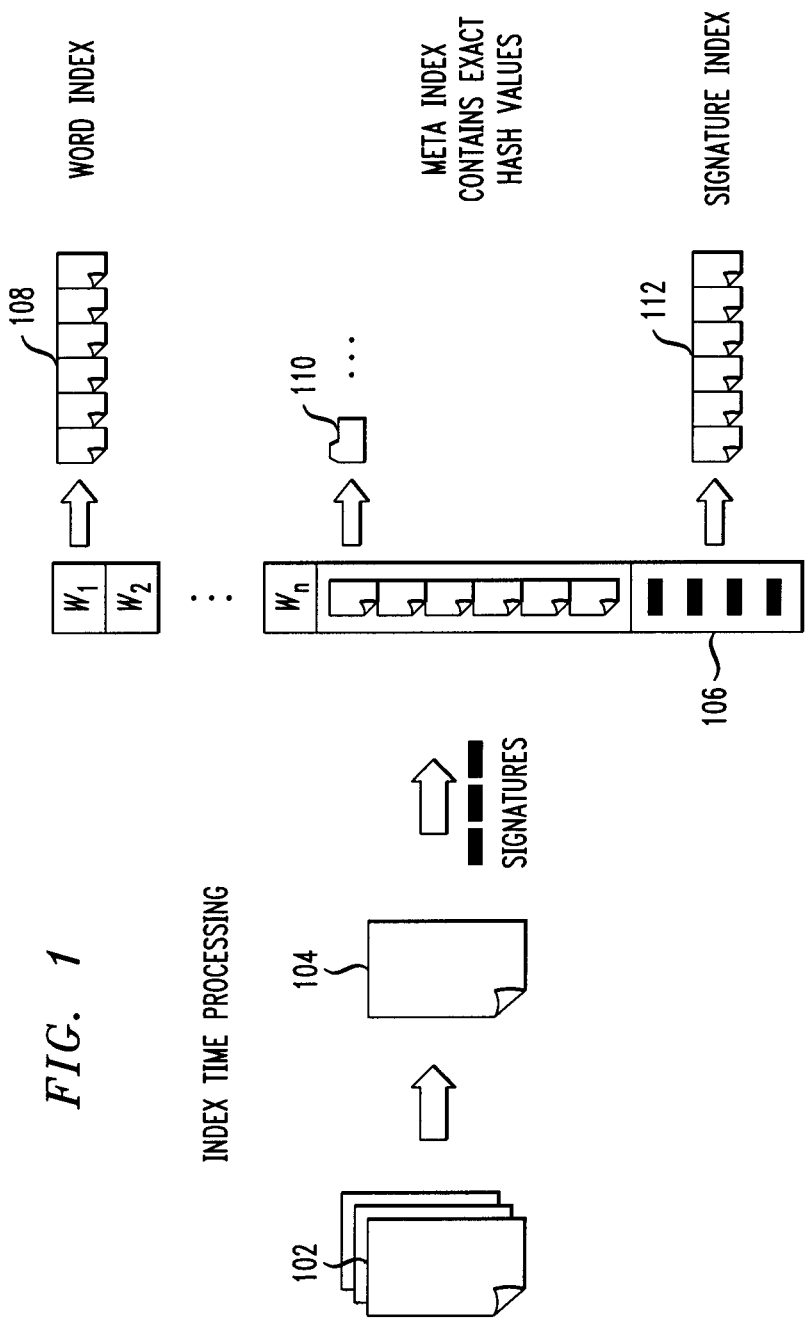
FIG. 1 is a diagram illustrating techniques for computing and storing one or more signatures for a document during the indexing process, according to an embodiment of the present invention.

Principles of the invention include dynamic detection of duplicate and/or near duplicate documents (for example, for e-discovery review). By way of example, sources of duplicate and/or near duplicate documents can include mirror sites on the World Wide Web, documents with different versions or with different formatting, progressive documents, forwarded e-mails, automated messages, responses with long histories, bulk e-mails, etc. Also, sources of near duplicates in other documents can include, for example, incremental versions of a document, documents following a standard template, etc.

Additionally, detection of near duplicates is useful, by way of example, for information storage and retrieval, for detecting plagiarism or copyright infringement, for a review process, etc. The techniques described herein can also include dynamic techniques for detecting such documents at reduced costs, while additionally including consistent treatment and enhanced ability to find data. For example, if all of the near-duplicate e-mails can be shown together, an individual can potentially quickly make a decision for the whole group. Also, in one or more embodiments of the invention, an individual can change the similarity levels in a dynamic manner and see the difference with color coding.

Further, one or more embodiments of the invention include determining similarity of e-mail documents. For example, a composite notion of similarity can be implemented based on similarity in e-mail content and subject. By way of example, one or more embodiments of the invention can base a similarity determination on the number of characters (or words) used and whether or not character or word ordering is similar. Also, a signature can be generated for each window of characters of a fixed length (for example, via use of a shingle-based technique).

Additionally, for e-mail attachments, one or more embodiments of the invention can include using an exact hashing technique (for example, MD5) or a shingle based technique for finding similar attachments. Similarity can also be determined in one or more embodiments of the invention based on communication group (for example, sender, receiver, bcc, etc.) via use of, for example, exact or near duplicate techniques. For other digital documents, one or more embodiments of the invention include using a similar strategy with the document content and meta-data, as the techniques detailed herein are not restricted to e-mail documents and can be adapted to any document containing structured and unstructured components.

As described herein, one or more embodiments of the invention include displaying all near duplicate documents as a group (for example, to a user), for a selected document, using a user-configurable similarity definition and a user-configurable similarity threshold value. Additionally, a similarity threshold and/or similarity definition can be dynamically changed and a new set of near duplicate documents based on the new threshold value can be fetched and displayed. The techniques detailed herein can additionally include generating a set of document signatures for each document and indexing, for each document, its set of signatures in an index. Also, all of the document identifiers for each signature can be indexed (for example, in an index called signature index) for more efficient retrieval.

One or more embodiments of the invention include fetching all signatures associated with an input document, fetching posting lists for each of the fetched signatures and finding the documents that have at least a minimum number of signatures that are the same as the input document. Additionally, newly-fetched documents can be shown in a color coding, emphasizing the differences with the already-seen document. Further, in one or more embodiments of the invention, a retrieved group of near duplicate documents can be processed together (for example, annotated as relevant or not-relevant).

As described herein, in contrast to disadvantages of existing approaches, one or more embodiments of the invention include detecting near duplicate documents for a given document at run-time. Different components of a document can have different semantics for a duplicate and/or near-duplicate determination. By way of example, in one or more embodiments of the invention, content may be near duplicate but an attachment must be exactly duplicate for an e-mail to be near duplicate.

Additionally, the techniques detailed herein can also include configuring the definition of near-duplicate at run-time, as well as providing flexibility of searching near-duplicate documents with varying similarity thresholds at run-time. One or more embodiments of the invention further include an ability to take actions such as marking relevant or non-relevant on groups of near-duplicate documents, and displaying groups of "duplicate documents with high match" in response to a keyword query by hashing the combination of signatures for each component.

FIG. 1 is a diagram illustrating techniques for computing and storing one or more signatures for a document during the indexing process, according to an embodiment of the present invention. By way of illustration, FIG. 1 depicts a group of documents 102, and for each document 104 a number of signatures 106 can be generated. Also, FIG. 1 depicts a word index 108, a meta index 110 and a signature index 112. The signatures are stored in the metadata index 110 and signature index 112. The metadata index 110 is used to look up the set of signatures that belong to a specific document. The signature index 112 is used to look up documents that contain a specific signature value.

In FIG. 1, for a document 104, different components of 104 can be illustrated. For example, for e-mail, content and attachments need to be processed separately. FIG. 1 depicts a generation of signatures for content. By way of example, for attachments, MD5 or some other hashing can be performed if an exact duplicate is desired. Alternatively, signatures can be generated for attachments as well.

Figure 2:
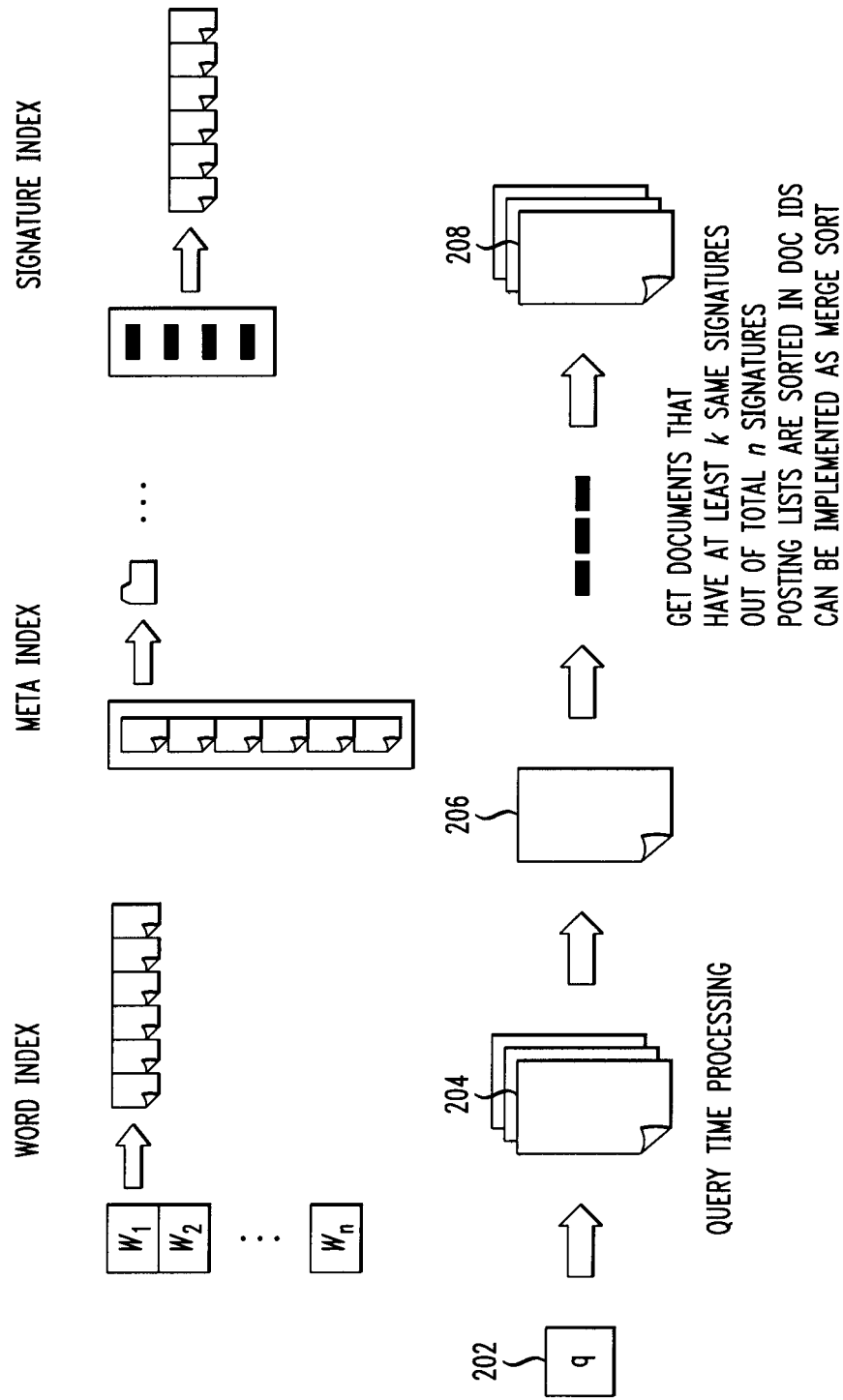
FIG. 2 is a diagram illustrating techniques for detecting duplicate and near-duplicate documents during run-time, according to an embodiment of the present invention.

FIG. 2 is a diagram illustrating techniques for detecting duplicate and near-duplicate documents during run-time, according to an embodiment of the present invention. By way of illustration, FIG. 2 depicts a query search string 202, a set of matching documents 204 retrieved using a word index from a search engine, a matching document 206. For document 206, a metadata index is used to look up its signatures and a signature index is used to find documents that have at least k signatures in common with that document. As such, FIG. 2 also depicts a set of documents 208 that have at least k signatures in common with document 206 (that is, the set of near-duplicates for document 206).

As detailed herein, one or more embodiments of the invention include generating document signatures. By way of example, in one or more embodiments of the invention, one can use all of the K-consecutive word sequences as signatures for a document. In such an embodiment, the value of K could be any non-zero value. Alternatively, for example, all of the words that occur in a document could be used as the set of signatures. Further, in one or more embodiments of the invention, signatures can be generated via an unstructured information management applications (UIMA) compliant annotator.

Additionally, in one or more embodiments of the invention, for each document, one can generate K shingles. As such, one can generate K different hash values using K different hash functions. Each hash function can generate a value, for example, by considering a window of n consecutive characters in the document at a time. Additionally, for example, for each hash function, one can use the minimum value generated by the function over the entire document as its shingle value. Each shingle value can include a range of any desired configuration (for example, depending on the relevant requirements).

Figure 3A:
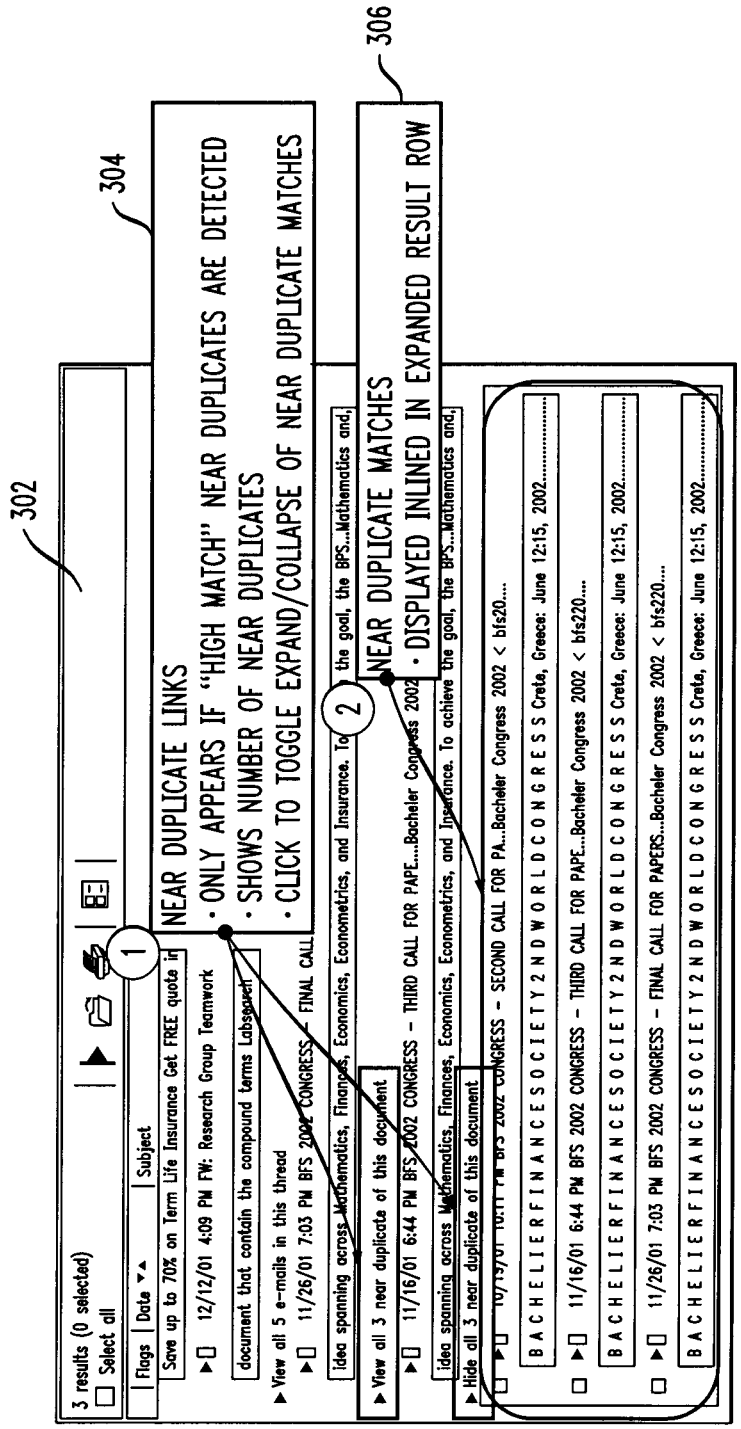
FIG. 3A is a screenshot illustrating a use case supported by the techniques described herein, according to an embodiment of the present invention.

FIG. 3A is a screenshot 302 illustrating a use case supported by the techniques described herein, according to an embodiment of the present invention. By way of illustration, FIG. 3A depicts near-duplicate links 304 and near-duplicate matches 306. Near-duplicate links 304 only appear if "high match" near-duplicates are detected. Also, the number of near-duplicates can be shown, and a user can additionally click to toggle, expand and/or collapse items. In an embodiment such as illustrated by FIG. 3A, a user can have the system automatically detect near-duplicate documents and alert him or her about their existence and quantity. In one or more embodiments of the invention, a link can appear for search results that have high match near-duplicates, and clicking that link will show those high match near-duplicates (for example, documents with maximum match threshold value).

Figure 3B:
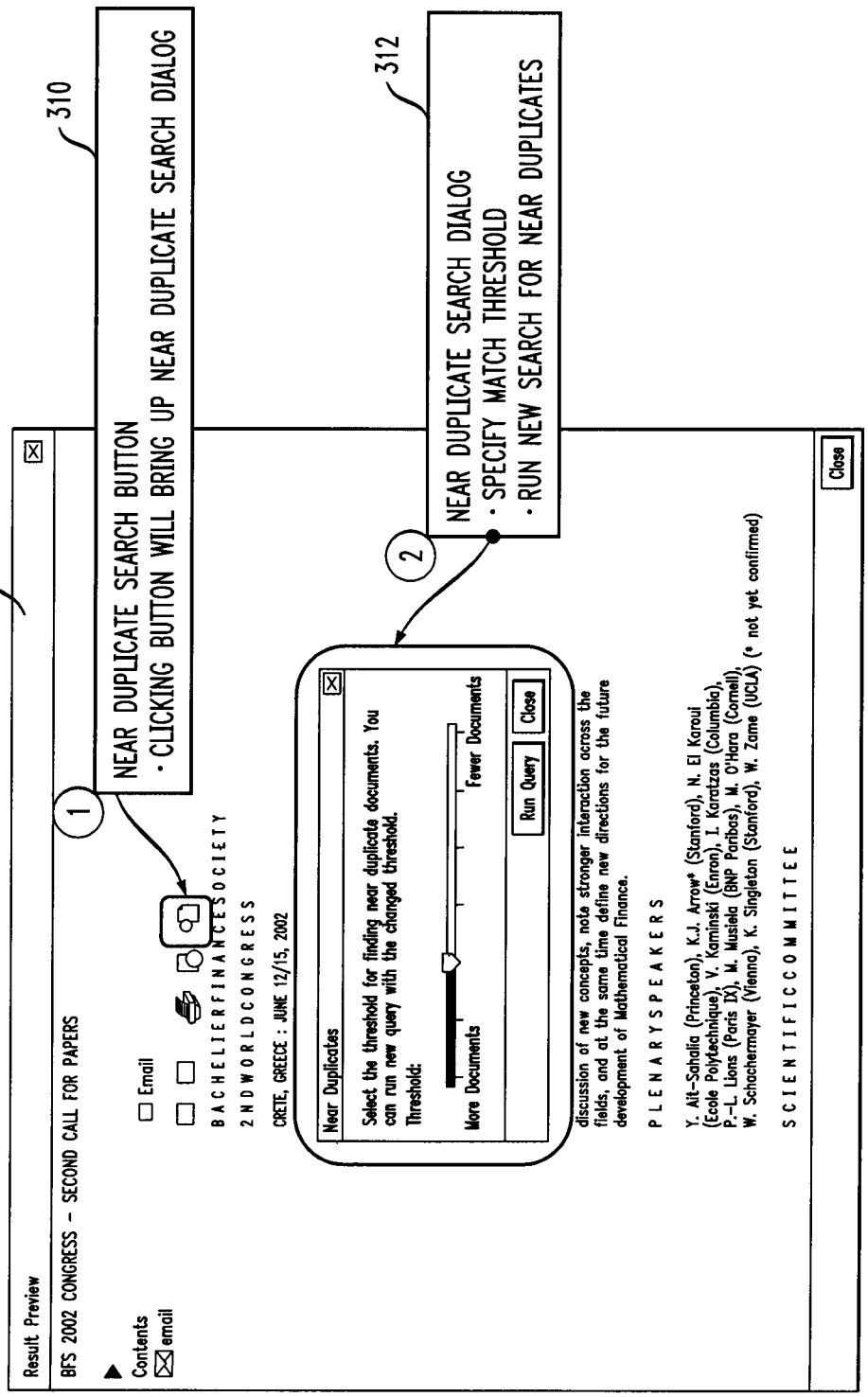
FIG. 3B is a screenshot illustrating a use case supported by the techniques described herein, according to an embodiment of the present invention.

FIG. 3B is a screenshot 308 illustrating a use case supported by the techniques described herein, according to an embodiment of the present invention. By way of illustration, FIG. 3B depicts a near-duplicate search button 310 and a near-duplicate search dialog 312. Clicking the near-duplicate search button 310 will bring up the near-duplicate search dialog 312, which can specify a match threshold and run a new search for near-duplicates. In an embodiment such as illustrated by FIG. 3B, a user can look at a specific document (for example, via a result preview functionality) and run a search to help him or her identify any near-duplicates of that document. In one or more embodiments of the invention, a near-duplicate search for any document can be accessed via a document preview screen and the selection of the match threshold can be done via a dialog box.

As detailed herein, given how the techniques described herein store the signature information in a search index, one or more embodiments of the invention can provide functions to efficiently retrieve a set of signatures for a specific document (via a metadata index), to efficiently retrieve a set of documents matching a specific signature value of k out of K signature values (via a signature index), as well as to efficiently retrieve groups of duplicate documents with a high (k=K) match. Such functions, for example, can be viewed as run-time application programming interfaces (APIs) for near duplicate document detection. Additionally, one or more embodiments of the invention include integrating with a user interface (UI). By way of example, one can make changes in the JavaServer pages (JSPs) to get a "Similar Email" link as well as a "Similarity Level" dropdown box. Also, one can add java script techniques for the JSP changes. Further, one can add getter and setter techniques to retrieve the similarity level for a current search for similar e-mails. Also, the techniques detailed herein can include adding action techniques that call the backend techniques for changing the similarity levels.

Figure 4:
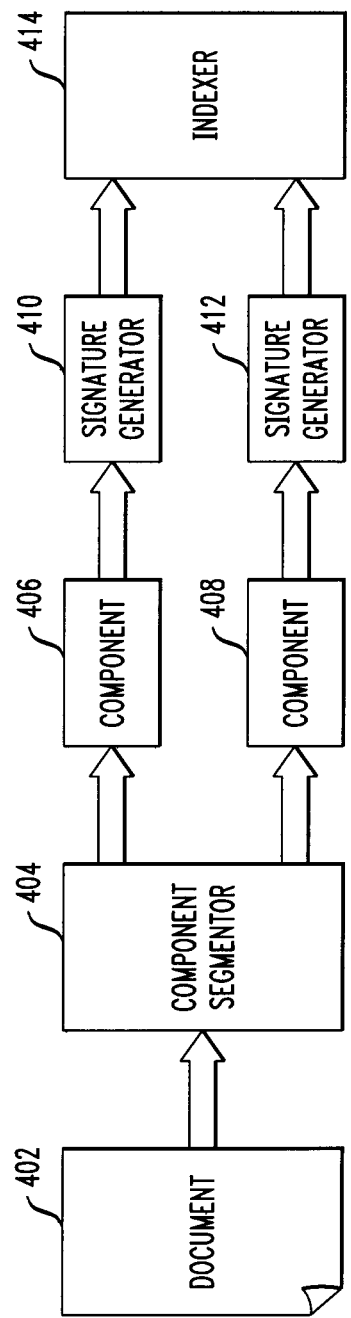
FIG. 4 is a block diagram illustrating an exemplary embodiment, according to an aspect of the invention.

FIG. 4 is a block diagram illustrating an exemplary embodiment, according to an aspect of the invention. By way of illustration, FIG. 4 depicts a document 402, a component segmentor module 404, components 406 and 408, signature generator modules 410 and 412, and indexer module 414.

A document may have several components. For example, an e-mail may have subject, content and/or attachments. As such, the component segmentor module 404 produces different components of a document. For each component, a set of signatures is generated by a signature generator module (for example, modules 410 and 412). Depending on the configuration, the set of signatures could be either for near duplicate detection or exact duplicate detection. Additionally, the indexer module 414 indexes signatures of all of the components along with all other metadata fields for a document.

Figure 5:
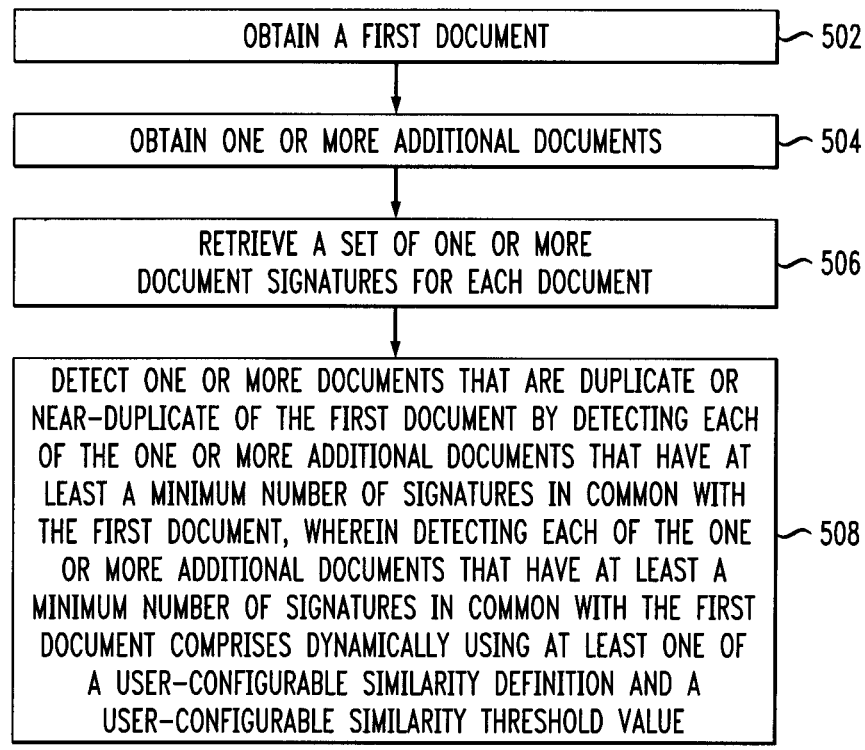
FIG. 5 is a flow diagram illustrating techniques for detecting one or more documents that are duplicate or near-duplicate of a first document, according to an embodiment of the invention.

FIG. 5 is a flow diagram illustrating techniques for detecting one or more documents that are duplicate or near-duplicate of a first document, according to an embodiment of the present invention. Step 502 includes obtaining a first document. Step 504 includes obtaining one or more additional documents. Step 506 includes retrieving a set of one or more document signatures for each document. At run-time, for example, one or more embodiments of the invention need only to retrieve the N signatures (using a metadata index) associated with the first document.

Step 508 includes detecting one or more documents that are duplicate or near-duplicate of the first document by detecting each of the one or more additional documents that have at least a minimum number of signatures in common with the first document, wherein detecting each of the one or more additional documents that have at least a minimum number of signatures in common with the first document comprises dynamically using at least one of a user-configurable similarity definition and a user-configurable similarity threshold value. During the detection step, one or more embodiments of the invention use a signature index to find near-duplicate documents that have at least K signatures in common.

The techniques depicted in FIG. 5 can also include displaying each of the additional documents that have at least a minimum number of signatures in common with the first document to a user. Additionally, one or more embodiments of the invention include dynamically changing the similarity threshold and/or the similarity definition, fetching a new set of documents that are duplicate or near-duplicate of the first document based on the new threshold value and/or new definition, and displaying the new set of documents that are duplicate and near-duplicate of the first document. Displaying the new set of documents that are duplicate or near-duplicate of the first document can include, for example, displaying the newly fetched set of documents in a color coding to emphasize differences with the already seen set of documents.

Further, the techniques depicted in FIG. 5 can include indexing, for each document, its set of signatures in an index. One or more embodiments of the invention can also include displaying each signature of the additional documents that is in common with the first document in color, as well as processing the documents that are duplicate or near-duplicate of the first document together as a group. Processing the documents that are duplicate or near-duplicate of the first document together as a group can include, for example, annotating the group as relevant and/or not-relevant.

The techniques depicted in FIG. 5 can also, as described herein, be run on a system, wherein the system includes distinct software modules, each of the distinct software modules being embodied on a tangible computer-readable recordable storage medium. The distinct software modules can include, for example, a component segmentor module, a signature generator module and an indexer module executing on a hardware processor.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 6:
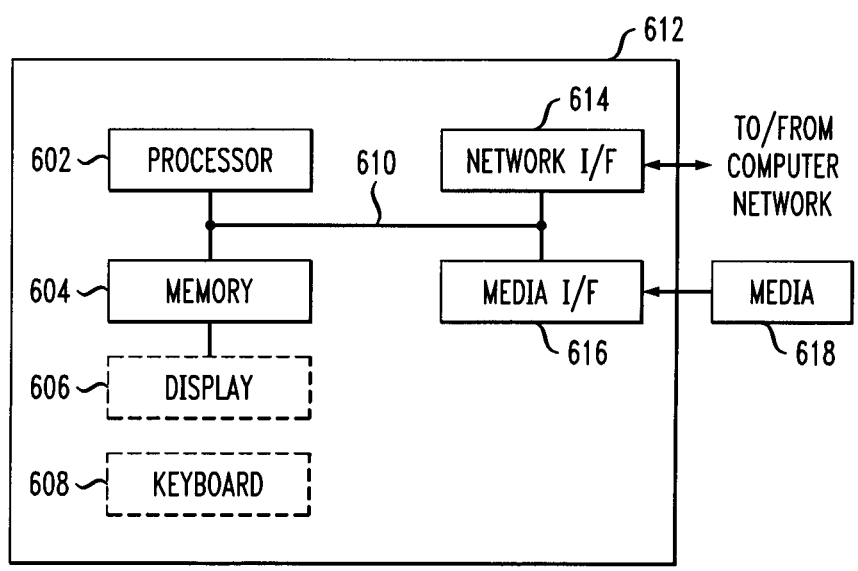
FIG. 6 is a system diagram of an exemplary computer system on which at least one embodiment of the invention can be implemented.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or implementing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 618 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 4. The method steps can then be carried out using the distinct software modules and/or sub-modules of the system, as described above, executing on one or more hardware processors 602. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, detecting near duplicate documents for a given document at run-time.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for detecting one or more documents that are duplicate or near-duplicate of a first document, wherein the method comprises:

obtaining a first document;

obtaining one or more additional documents;

generating multiple signatures for (i) the first document and (ii) each of the one or more additional documents;

indexing each of the multiple signatures for each document into a metadata index;

indexing each of multiple document identifiers associated with each respective signature into a signature index;

retrieving a set of one or more document signatures corresponding to the first document from the metadata index;

detecting one or more documents that are duplicate or near-duplicate of the first document by identifying, based on document identifiers, from the signature index, each of the one or more additional documents that are associated with at least a minimum number of signatures in common with the first document, wherein said identifying comprises dynamically implementing, at run-time, (i) a user-configurable similarity definition applicable to each of multiple document components, wherein the similarity definition is based on (a) total number of words in each document and (b) order of words in each document, and (ii) a user-configurable similarity threshold value;

dynamically changing the at least one of the similarity threshold and the similarity definition;

fetching a new set of one or more documents that are duplicate or near-duplicate of the first document based on the at least one of new threshold value and new definition; and displaying the new set of one or more documents that are duplicate and near-duplicate of the first document, wherein displaying the new set of one or more documents that are duplicate or near-duplicate of the first document comprises displaying the newly fetched set of one or more documents to emphasize one or more differences with the already seen set of one or more documents.

2. The method of claim 1, further comprising displaying each of the one or more additional documents that have at least a minimum number of signatures in common with the first document to a user.

3. The method of claim 1, further comprising displaying each signature of the one or more additional documents that is in common with the first document in color.

4. The method of claim 1, further comprising processing the one or more documents that are duplicate or near-duplicate of the first document together as a group.

5. The method of claim 4, wherein processing the one or more documents that are duplicate or near-duplicate of the first document together as a group comprises annotating the group as at least one of relevant and not-relevant.

6. The method of claim 1, wherein the method is run on a system, wherein the system comprises one or more distinct software modules, each of the one or more distinct software modules being embodied on a tangible computer-readable recordable storage medium, and wherein the one or more distinct software modules comprise a component segmentor module, a signature generator module and an indexer module executing on a hardware processor.

7. A computer program product comprising a tangible non-transitory computer readable recordable storage medium including computer useable program code for detecting one or more documents that are duplicate or near-duplicate of a first document, the computer program product including:
   computer useable program code for obtaining a first document;
   computer useable program code for obtaining one or more additional documents;
   computer useable program code for generating multiple signatures for (i) the first document and (ii) each of the one or more additional documents;
   computer useable program code for indexing each of the multiple signatures for each document into a metadata index;
   computer useable program code for indexing each of multiple document identifiers associated with each respective signature into a signature index;
   computer useable program code for retrieving a set of one or more document signatures corresponding to the first document from the metadata index;
   computer useable program code for detecting one or more documents that are duplicate or near-duplicate of the first document by identifying, based on document identifiers, from the signature index, each of the one or more additional documents that are associated with at least a minimum number of signatures in common with the first document, wherein said identifying comprises dynamically implementing, at run-time, (i) a user-configurable similarity definition applicable to each of multiple document components, wherein the similarity definition is based on (a) total number of words in each document and (b) order of words in each document, and (ii) a user-configurable similarity threshold value;
   computer useable program code for dynamically changing the at least one of the similarity threshold and the similarity definition;
   computer useable program code for fetching a new set of one or more documents that are duplicate or near-duplicate of the first document based on the at least one of new threshold value and new definition; and
   computer useable program code for displaying the new set of one or more documents that are duplicate and near-duplicate of the first document, wherein displaying the new set of one or more documents that are duplicate or near-duplicate of the first document comprises displaying the newly fetched set of one or more documents to emphasize one or more differences with the already seen set of one or more documents.

8. The computer program product of claim 7, further comprising computer useable program code for displaying each of the one or more additional documents that have at least a minimum number of signatures in common with the first document to a user.

9. The computer program product of claim 7, wherein the computer usable program code comprises one or more distinct software modules, and wherein the one or more distinct software modules comprise a component segmentor module, a signature generator module and an indexer module executing on a hardware processor.

10. A system for detecting one or more documents that are duplicate or near-duplicate of a first document, comprising:
    a memory; and
    at least one processor coupled to the memory and operative to:
      obtain a first document;
      obtain one or more additional documents;
      generate multiple signatures for (i) the first document and (ii) each of the one or more additional documents;
      index each of the multiple signatures for each document into a metadata index;
      index each of multiple document identifiers associated with each respective signature into a signature index;
      retrieve a set of one or more document signatures corresponding to the first document from the metadata index;
      detect one or more documents that are duplicate or near-duplicate of the first document by identifying, based on document identifiers, from the signature index, each of the one or more additional documents that are associated with at least a minimum number of signatures in common with the first document, wherein said identifying comprises dynamically implementing, at run-time, (i) a user-configurable similarity definition applicable to each of multiple document components, wherein the similarity definition is based on (a) total number of words in each document and (b) order of words in each document, and (ii) a user-configurable similarity threshold value;
      dynamically change the at least one of the similarity threshold and the similarity definition;
      fetch a new set of one or more documents that are duplicate or near-duplicate of the first document based on the at least one of new threshold value and new definition; and
      display the new set of one or more documents that are duplicate and near-duplicate of the first document, wherein displaying the new set of one or more documents that are duplicate or near-duplicate of the first document comprises displaying the newly fetched set of one or more documents to emphasize one or more differences with the already seen set of one or more documents.

11. The system of claim 10, wherein the at least one processor coupled to the memory is further operative to display each of the one or more additional documents that have at least a minimum number of signatures in common with the first document to a user.

12. The system of claim 10, further comprising a tangible computer-readable recordable storage medium having one or more distinct software modules embodied thereon, the one or more distinct software modules comprising a component segmentor module, a signature generator module and an indexer module executing on a hardware processor.

* * * * *